United States Patent [19]
Corrigan

[11] Patent Number: 6,061,301
[45] Date of Patent: May 9, 2000

[54] FILTERING OF OVERBURDEN AZIMUTHAL ANISOTROPY EFFECTS FROM 3D SEISMIC SURVEY SIGNALS

[75] Inventor: Dennis Corrigan, Plano, Tex.

[73] Assignee: Atlantic Richfield Company, Los Angeles, Calif.

[21] Appl. No.: 08/885,384

[22] Filed: Jun. 30, 1997

[51] Int. Cl.$^7$ .................................................. G01V 1/00
[52] U.S. Cl. ............................................... 367/75; 367/51
[58] Field of Search .................................. 367/31, 38, 39, 367/47, 56, 75, 51

[56] References Cited

U.S. PATENT DOCUMENTS

| | | | |
|---|---|---|---|
| 4,970,696 | 11/1990 | Crews et al. ................................ | 367/15 |
| 5,258,960 | 11/1993 | Swan ........................................ | 367/38 |
| 5,297,108 | 3/1994 | Swan ........................................ | 367/38 |
| 5,430,689 | 7/1995 | Rigsby et al. ............................. | 367/15 |
| 5,508,973 | 4/1996 | Mallick et al. ............................ | 367/38 |
| 5,515,335 | 5/1996 | Swan ........................................ | 367/47 |
| 5,532,978 | 7/1996 | Corrigan ................................... | 367/75 |

OTHER PUBLICATIONS

Swan, "Properties of direct AVO hydrocarbon indicators", *Offset–dependent reflectivity—Theory and Practice of AVO Analysis* (Castagna, J.P. & Backus, M.M., eds., Soc. Expl. Geophys., 1993), pp. 78–92.

Taner, et al., "Complex Seismic Trace Analysis", *Geophysics*, vol. 44, No. 6 (Jun., 1979), pp. 1041–1063.

Herbert Swan, Amplitude–versus–offset measurement errors in a finely layered medium, Geophysics, vol. 56 No. 1 Jan. 1, 1991 pp. 41–49.

John Castagna & Milo Backus, Offset–Dependent Reflectivity–Theory and Practice of AVO Analysis, Society of Exploration Geophysics, Jan. 1, 1993.

Subhashis Mallick, A simple approximation to the P–wave reflection coefficient and its implication in the inversion of amplitude variation with offset data, Geophysics, vol. 58, No.4 pp. 544–552, Apr. 1, 1993.

S. Mallick & L. Frazer, Reflection/Transmission coefficients and azimuthal anisotropy in marine seismic studies, Europe Geophys. Soc. Symp. Barcelona Spain, Geophysics Journal vol. 105, No. 1 pp. 241–252, Apr. 1, 1991.

H. Swan, Noise Sensitivity on Linear Seismic Inversion, 63rd Annual Meeting and International Exhibition, pp. 1177–1180, Wash. , DC, Sep. 26, 1993.

H. Swan, Amplitude versus offset analysis in finely layered media, Society of Exploration Geophysicists, 58th Annual Int'l. Meeting and Exposition, pp. 1195–1198, Jan. 1, 1988.

*Primary Examiner*—John Barlow
*Assistant Examiner*—Anthony Jolly
*Attorney, Agent, or Firm*—Anderson, Levine & Lintel

[57] ABSTRACT

A method and system for correcting seismic survey signals for separating and correcting for the effects of azimuthal anisotropy caused by the overburden, rather than the subsurface reflectivity, is disclosed. Following an initial estimate and normal moveout correction of the traces in a common midpoint gather, analytical traces are generated for coefficient series corresponding to zero-offset travel time response and to the azimuthal anisotropy, over the corrected gather. The quadrature-phase component of the azimuthal anisotropy coefficient series relative to the zero-offset travel time coefficient series indicates the effects of overburden azimuthal anisotropy, while the in-phase component indicates the effects of azimuthal anisotropy from subsurface reflective interfaces. Additional normal moveout correction to correct for the overburden azimuthal anisotropy may then be performed.

19 Claims, 7 Drawing Sheets

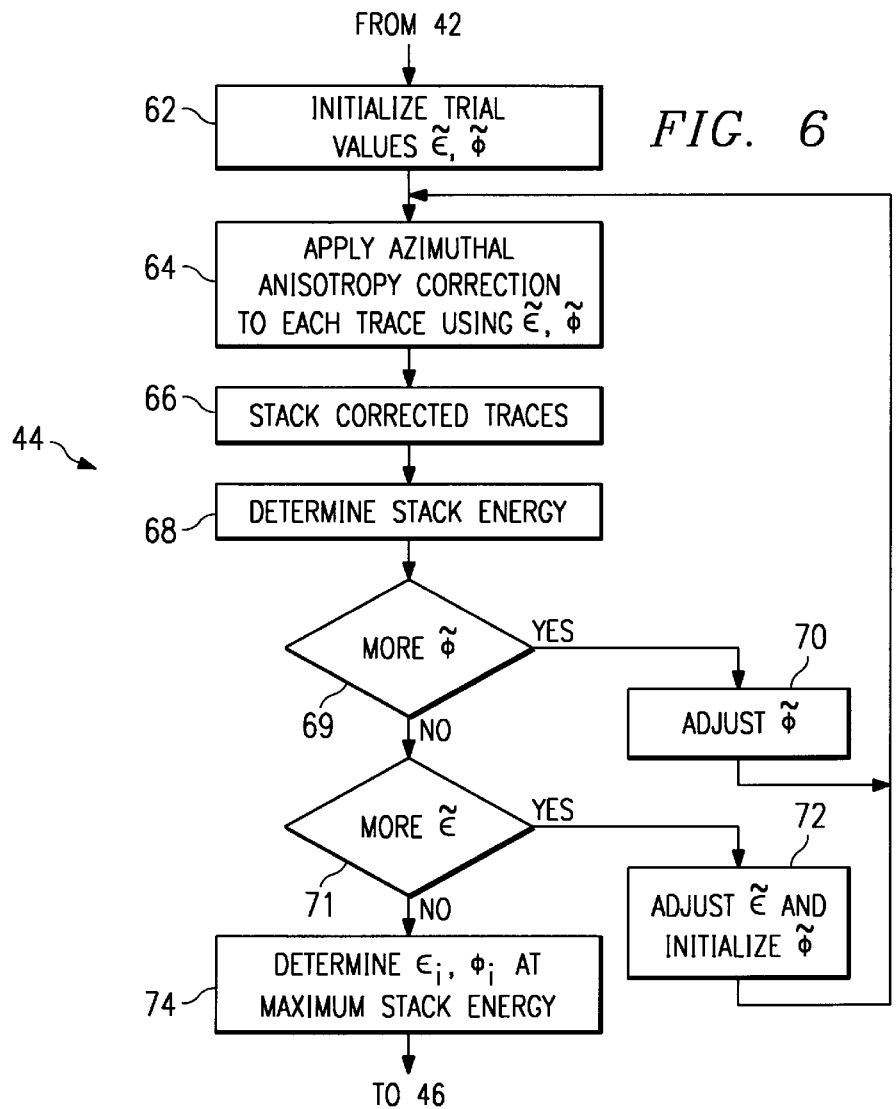
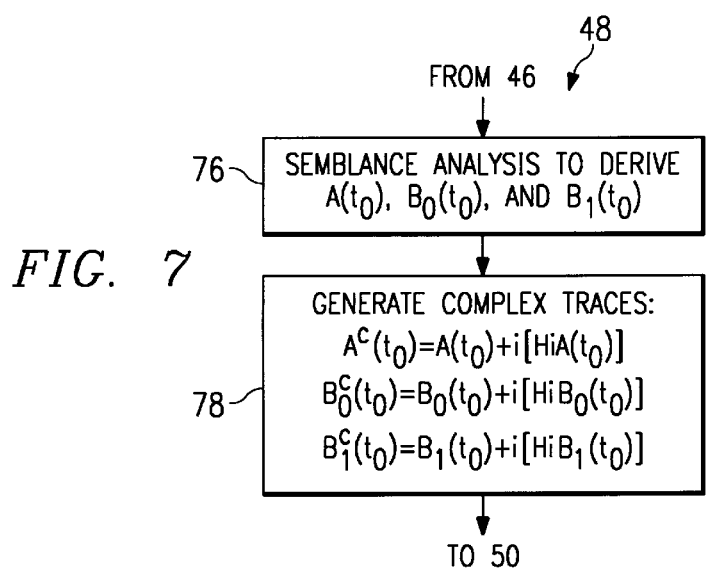

FILTERING OF OVERBURDEN AZIMUTHAL ANISOTROPY EFFECTS FROM 3D SEISMIC SURVEY SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of exploration for seismic prospecting for oil and gas reservoirs, and is more specifically directed to correction of seismic survey signals to more accurately detect and characterize geological formations.

The use of seismic surveys is now fundamental in the search for oil and gas reservoirs in the earth. As is rudimentary in the art, seismic surveys are performed by imparting acoustic energy into the earth at one or more locations (either at a land surface or in a marine environment), and then detecting reflected and refracted acoustic energy at other locations. The delay time between the imparting of the acoustic energy at the source location and detection of the same wave at a receiver location is indicative of the depth at which a particular reflecting geological interface is located. The field of seismic data analysis is concerned with techniques for analyzing the detected acoustic energy to determine both the location and also the properties of various geological strata.

Recent advances in the computational ability of modern digital computers has enabled seismic survey data to be gathered and analyzed according to three-dimensional ("3D") techniques. Conventional two-dimensional ("2D") seismic surveys are acquired along shot lines, where seismic source locations are collinear with a line of receivers (geophones and hydrophones, for land and mine surveys, respectively). While 3D seismic surveys may be acquired by analyzing multiple 2D surveys, more advanced 3D surveys involve arrays of seismic receivers that receive reflected acoustic energy imparted at varying locations that are not necessarily collinear with multiple receiver locations but instead are specifically selected to provide a rich assortment of azimuths for common midpoints. These more advanced 3D surveys provide azimuthal variations that are not correlated with offset, as can occur in the quasi-2D approach to gathering 3D seismic data. Examples of 3D seismic survey designs, specifically for marine surveys, are described in U.S. Pat. Nos. 4,970,696 and 5,430,689, commonly assigned herewith and incorporated herein by this reference.

While simple models of subsurface geology assume azimuthal isotropy in the propagation of acoustic velocity, it has been observed that azimuthal anisotropy is in fact present in many survey regions, such that the velocity of acoustic energy depends upon the azimuth of the source-receiver path. The detection of a preferred azimuthal direction at a reflecting interface can provide important information regarding a geological feature; for example, a preferred azimuthal reflection direction can indicate the presence of aligned vertical fractures. However, azimuthal anisotropy can also be present in the overburden (i.e., formations above a reflecting interface), and serve to mask the important anisotropy of the subsurface reflectivity. Normal moveout correction of the seismic data both for offset-dependent delays and also for azimuthal anisotropy caused by the overburden, is therefore typically performed in producing stacked traces of improved signal-to-noise ratio for use in a 3D seismic survey. By way of further background, U.S. Pat. No. 5,532,978, commonly assigned herewith and incorporated herein by this reference, describes a method of deriving and applying azimuthal anisotropy corrections to seismic survey signals.

By way of further background, a known technique in the generation and analysis of conventional seismic surveys is referred to as amplitude-versus-offset ("AVO") analysis. According to the AVO approach, attributes of a subsurface interface are determined both from normal-incidence amplitude of reflected seismic energy, and also from the dependence of the detected seismic reflections on the angle of incidence of the energy relative to the vertical. According to conventional AVO analysis, multiple seismic traces (i.e., time-domain signals at different detection locations) that include a signal from a common reflection point are collected; such a group of traces is commonly referred to as a common-depth point (CDP) gather. Typically, a series of common reflection points for the same source-receiver pairs underlie the same surface location at the midpoint between the source and receiver for multiple offsets; as such, this gather is also often referred to as a common midpoint (CMP) gather. From the CDP (or CMP) gather, one may derive the amplitude R of a reflected seismic wave from an interface (i.e., the "target horizon") as a function of the angle of incidence $\theta$ from the normal according to the following relationship:

$$R(\theta) = A + B \sin^2 \theta$$

In this case, the coefficient A is the zero-offset response (also referred to as the AVO intercept), while the coefficient B is referred to as the AVO slope, or gradient, as it is representative of the rate of change of amplitude with the square of the angle of incidence.

Analysis of the AVO slope and intercept can provide indicators of interesting formations, from an oil and gas exploration standpoint. For example, as described in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92, incorporated herein by reference, variations in the A and B values from a theoretical A-versus-B trend line for the expected stratigraphic sequences can indicate the location of hydrocarbon reserves. According to another series of approaches, the A and B coefficient values in a survey, considered as functions of time, are converted into complex, or analytical, traces, by applying the Hilbert transform to the measured A and B values. One well-known AVO indicator is the product of the complex AVO intercept value A with the complex conjugate of the AVO slope B (f(A,B)=AB*), which is known to indicate the presence of hydrocarbon bearing sands of the so-called "Class 3" type.

By way of further background, U.S. Pat. No. 5,661,697, issued Aug. 26, 1997, assigned to Atlantic Richfield Company and incorporated herein by this reference, describes a new AVO indicator for common depth points based upon the value of the AVO intercept A and the deviation of the AVO gradient B from a trend line. The indicator described in this application has been found useful for distinguishing hydrocarbon sands from surrounding formations.

By way of still further background, copending application Ser. No. 08/614,744, filed Mar. 13, 1996, entitled "Method and System for Detecting Hydrocarbon Reservoirs Using Amplitude-versus-Offset Analysis of Seismic Signals", assigned to Atlantic Richfield Company and incorporated herein by this reference, describes a new AVO indicator for common depth points based upon the rate of change of the product of the AVO intercept value and the AVO gradient value for the depth point under analysis, along the direction of a deviation vector of the AVO intercept value and the AVO gradient value from a background trend for depth points surrounding the depth point under analysis in time and space. This new indicator, referred to therein as the Δ(AB*) indicator, has proven to be especially valuable in the detection of very deep gas-bearing sands, such sands commonly referred to as Class 1 and Class 2 sands.

In the field of AVO processing, however, certain offset-dependent effects, particularly in the overburden rather than at reflective interfaces, can cause errors in the generation of the survey. In addition, accurate AVO analysis itself requires precise stacking velocity measurements, as stacking velocity errors can produce effects that far outweigh the true AVO variations exhibited by the reflecting stratum. U.S. Pat. No. 5,258,960, commonly assigned herewith and incorporated herein by this reference, describes a method for identifying and filtering the effects of overburden-caused variations in stacking velocity. As described therein, velocity errors are exhibited by quadrature phase components of the product of the AVO coefficients, while true AVO effects are exhibited by the magnitude of the AVO intercept and AVO slope A, B, respectively, that have relative phases close to 0° or 180°. As described in this patent, one may derive a stacking velocity function that minimizes the quadrature phase components of the AVO product indicator, improving the normal moveout correction applied to the survey.

BRIEF SUMMARY OF THE INVENTION

The invention may be implemented into an automated method of processing 3D seismic survey signals, and into a computer system for performing the same. According to the present invention, the traces of a common midpoint gather of traces are decomposed to produce a first coefficient series associated with travel time and a second coefficient series associated with azimuth. The quadrature phase component of an analytical trace of the second coefficient series, relative to the first component series, is measured, and minimized by iterative correction of the seismic trace data.

BRIEF DESCRIPTION OF THE SEVERAL VIEWS OF THE DRAWING

FIG. 6 is a flow chart illustrating the operation of the process of determining initial values of the magnitude and preferred azimuth of the azimuthal anisotropy in the survey, according to the preferred embodiment of the invention.

FIG. 7 is a flow chart illustrating the operation of the process of generating analytical traces for the azimuthal anisotropy coefficients, according to the preferred embodiment of the invention.

DETAILED DESCRIPTION OF THE INVENTION

Figure 1:
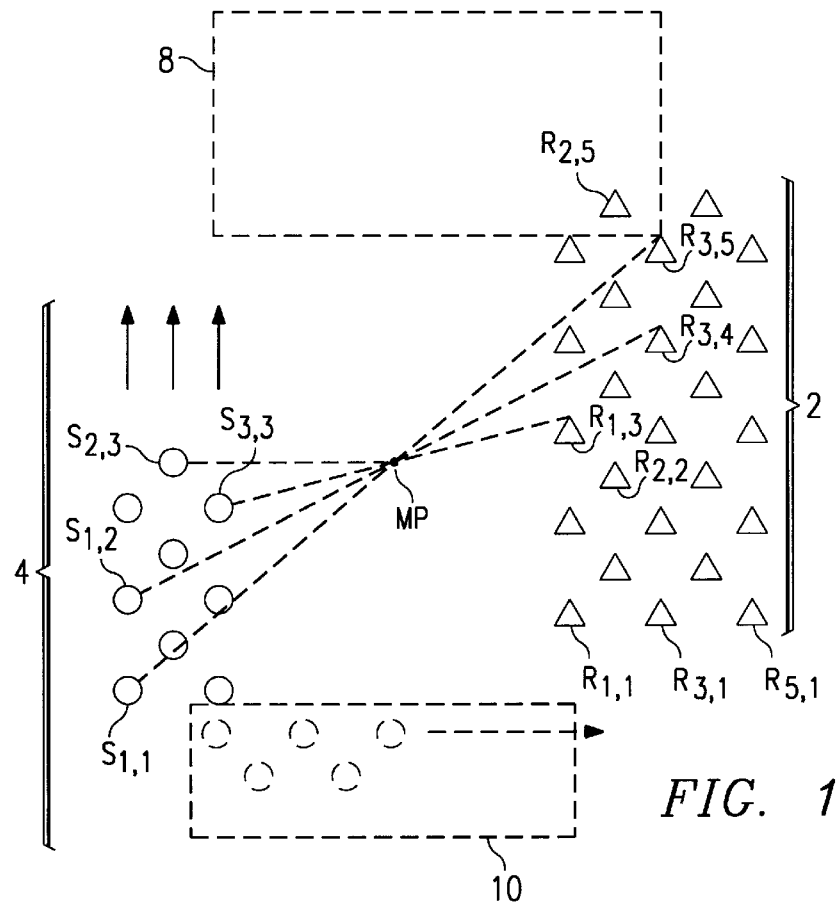
FIG. 1 is a schematic diagram, in plan view, of a simplified 3D seismic survey.

Referring first to FIG. 1, a simplified example of a 3D seismic survey will first be described, for purposes of explanation of the preferred embodiment of the present invention. This exemplary land-based or marine seismic survey, shown in plan view in FIG. 1, includes array 2 of receivers R deployed at the surface of the earth. In this simplified example, receiver array 2 includes twenty-five receivers R, arranged in a staggered array of five rows and five columns. Shot array 4, separated from receiver array 2, includes a group of source locations S at which one or more seismic sources impart acoustic energy into the earth. Typically, a single seismic source is moved along the earth, for example in a truck for land-based surveys or as a seismic source towed by a boat in a marine survey, and is activated at specific source locations S in a sequence. The acoustic energy imparted at each source location S travels through the earth and, after reflection from subsurface geological interfaces, is detected by each of receivers R in array 2.

The example of a single midpoint MP, common to several source-receiver paths in this survey, is shown in FIG. 1 to illustrate the acquisition of 3D seismic survey signals. As is fundamental in the seismic survey art, midpoint MP overlies potential reflection points at which acoustic energy imparted from a source location S is reflected toward a receiver location R. As shown in FIG. 1, the path of energy imparted at source location $S_{1,1}$ and detected at receiver location $R_{3,5}$ has midpoint MP, as do the paths between source location $S_{1,2}$ and receiver location $R_{3,4}$, between source location $S_{3,3}$ and receiver location $R_{3,4}$, and between source location $S_{2,3}$ and receiver location $R_{1,3}$. Each of these source-receiver paths, in addition to having midpoint MP in common, are of different length (or offset) and direction (or azimuth). Of course, many additional source-receiver paths between source locations S in source array 4 and receiver locations R in receiver array 2 will also have midpoint MP as their midpoints, and will be at still different offset and azimuth.

As illustrated in FIG. 1, typical 3D seismic surveys will also include additional receiver arrays such as array 8, and additional source arrays such as array 10. Certain ones of the source locations in array 4 and receiver locations in array 2 may also reside in these additional arrays; for example, receiver location $R_{2,5}$ can be considered to be present in each of arrays 2 and 8. The additional arrays will provide more traces that have midpoint MP, at additional offsets and azimuths. For example, while the azimuths of energy from source array 4 to receiver array 2 will range from NE to SE (or from a bearing of 45° to a bearing of 135°), the azimuths of energy from source array 8 to receiver array 10 will range from NW to NE (or from 315° to 45°).

Of course, the arrangement illustrated in FIG. 1 is simplified for the purposes of this description. Actual 3D seismic surveys often have widely separated source and receiver arrays, as described in the above-incorporated U.S. Pat. No. 5,430,689.

As described above, multiple seismic survey signals, or traces, in the survey of FIG. 1 will have midpoint MP in common, such that a common midpoint gather (CMP) for midpoint MP will include multiple traces, including those corresponding to source-receiver pairs ($S_{1,1}$, $R_{3,5}$), ($S_{1,2}$, $R_{3,4}$), ($S_{3,3}$, $R_{3,4}$), and ($S_{2,3}$, $R_{1,3}$). This common midpoint gather, as well as those for other midpoints in the survey, will have traces at varying offsets and azimuths, as evident from the exemplary source-receiver pairs illustrated in FIG. 1.

Figure 2:
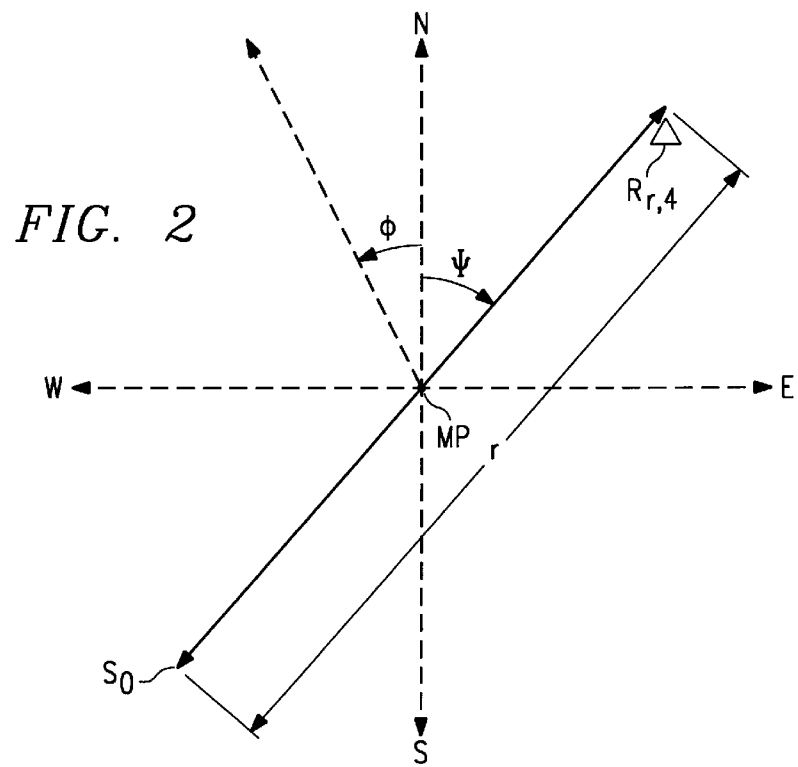
FIG. 2 is a schematic diagram, in plan view, illustrating the location of an exemplary receiver in a seismic survey.

One may therefore designate the collective sets of detected acoustic energy traces in a common midpoint gather, such as for midpoint MP, as D(t, r, Ψ), where t is the time at which the energy is detected, r is the offset distance of the receiver from the source, and Ψ is the azimuth of the source-receiver path. For example, referring to FIG. 2, a specific receiver $R_{r,\Psi}$ is illustrated in a survey region. Receiver $R_{r,\Psi}$ is located at an offset distance r from source $S_0$, and at an azimuthal angle Ψ from the reference bearing (which is north, in this example). In this example, azimuthal anisotropy is present in the survey region, with a preferred direction (i.e., azimuth of highest velocity) at azimuth Ψ.

As is well-known in the art, normal moveout corrections are typically made to traces in a common midpoint gather to correct for the additional delay time for longer-offset traces, such that the travel time variable t is effectively normalized to a zero-offset travel time. As such, prestack traces in a common midpoint gather may be expressed as N($t_0$, θ, Ψ), where to is the zero-offset two-way time, θ is the angle of incidence of the energy at a reflecting interface (and as such is typically expressed as a function, θ($t_0$), of two-way time $t_0$), and Ψ remains as the azimuth of the source-receiver path. The moveout-corrected dataset N($t_0$, θ, Ψ) is generally the input data for conventional amplitude-versus-offset analysis.

In the ideal case where the earth exhibits no azimuthal anisotropy, the dataset N($t_0$, θ, Ψ) will have no variation with azimuth Ψ, such that N($t_0$, θ, Ψ) may simply and fully be expressed as N($t_0$, θ). Conversely, when azimuthal anisotropy is present in seismic survey signals, caused by either azimuthal velocity variations in the overburden or by a preferred azimuthal direction at the reflecting interface, the dataset must be expressed as N($t_0$, θ, Ψ) to accurately convey all information that is present.

According to the present invention, it has been discovered that dataset N($t_0$, θ, Ψ) will have a dependence upon the zero-offset two-way time $t_0$, offset angle θ, and azimuth Ψ, that may be closely modeled by the expression:

$$N(t_0, \theta, \Psi) = A(t_0) + [B_0(t_0) + B_1(t_0) \cos 2(\Psi - \psi)] \sin^2 \theta$$

or alternatively:

$$N(t_0, \theta, \Psi) = A(t_0) + [B_0(t_0) + B_1(t_0) \cos 2\Psi \cos 2\psi + B_1(t_0) \sin 2\Psi \sin 2\psi] \sin^2 \theta$$

where ψ is the azimuth of highest velocity. Using one of these expressions as a model for dataset N($t_0$, θ, Ψ), and assuming adequate sampling of data at varying depths, offsets, and azimuths, one may use a least-squares or other analysis to estimate the coefficients A, $B_0$, $B_1$ for each of multiple zero-offset two-way times $t_0$. These estimates could be performed similarly to the estimation of AVO intercept and slope functions A($t_0$), B($t_0$) in conventional AVO techniques. Upon generation of estimated coefficient functions A($t_0$), $B_0(t_0)$, $B_1(t_0)$, one could then determine the extent of azimuthal anisotropy, primarily from the magnitude of the coefficient $B_1$.

It is useful to isolate the effects of azimuthal anisotropy due to subsurface reflectivity from the effects of azimuthal anisotropy caused by the overburden. For example, in the seismic exploration for oil and gas reservoirs using AVO techniques, azimuthal anisotropy caused by the overburden is preferably corrected out of the dataset, so that preferred azimuthal directions exhibited by reflecting interfaces can be analyzed to detect and characterize potential hydrocarbon-bearing formations. However, the simple best-fit estimation of azimuthal anisotropy coefficient $B_1$ described above provides no insight into the cause or type of azimuthal anisotropy exhibited in the survey region. As a result, azimuthal anisotropy in the overburden can mask the azimuthal effects of subsurface reflectors when conventional simple best-fit estimation techniques are used.

It has been observed, in connection with the present invention, that the phase relationship between azimuthal anisotropy coefficient $B_1$ and intercept coefficient A indicates the nature of the azimuthal anisotropy. This effect is analogous to the information conveyed by the phase relationship between AVO slope B and AVO intercept A over time, as described in U.S. Pat. No. 5,258,960, incorporated hereinto by reference.

Figure 3A:
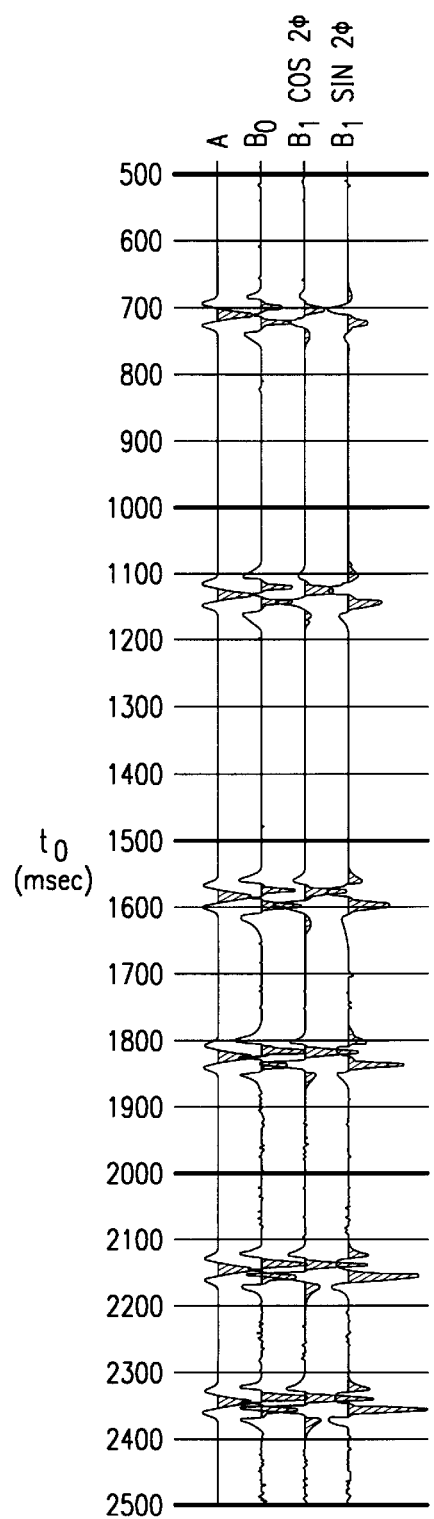
FIG. 3a is a series of plots of model coefficient values versus two-way time, illustrating the phase relationship between the intercept coefficient and two components of the azimuthal anisotropy coefficient.
Figure 3B:
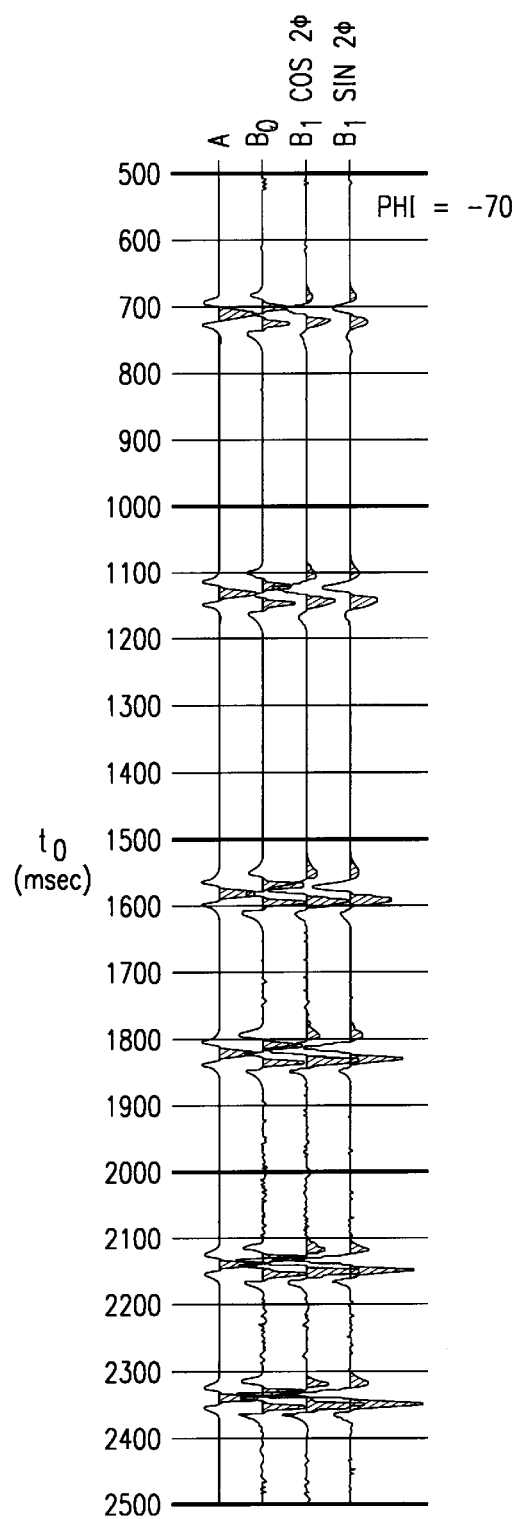
FIGS. 3b through 3e are series of plots of model coefficient values versus two-way time, over varying preferred azimuthal velocity directions.
Figure 3C:
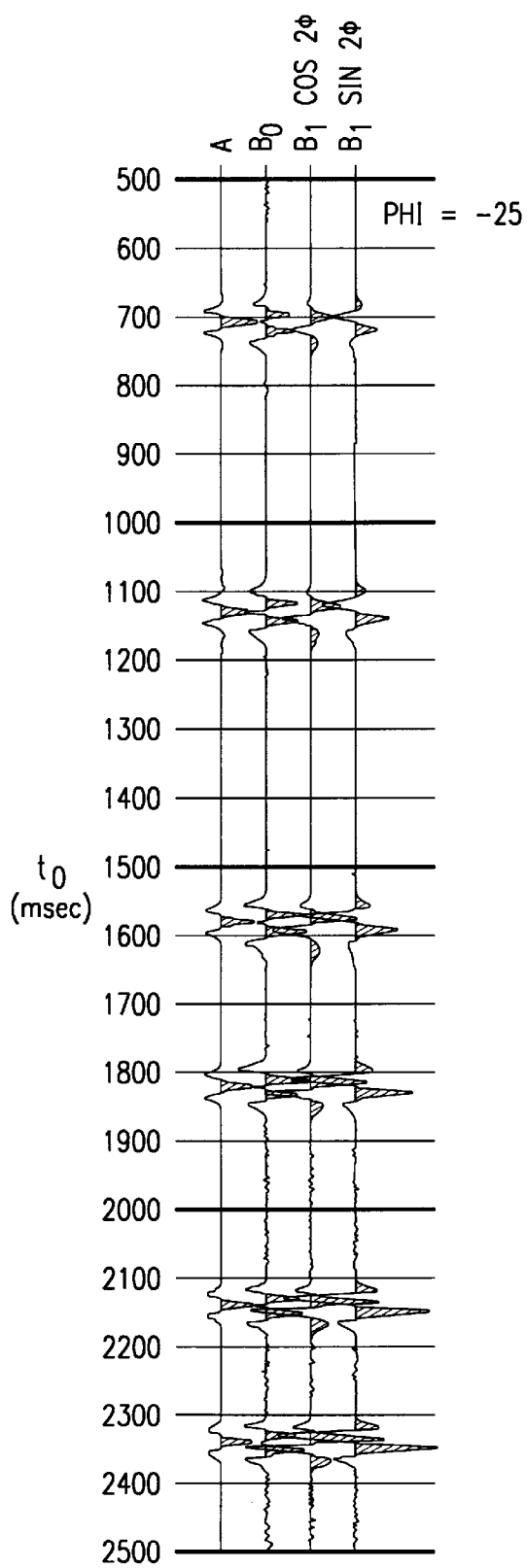
Figure 3D:
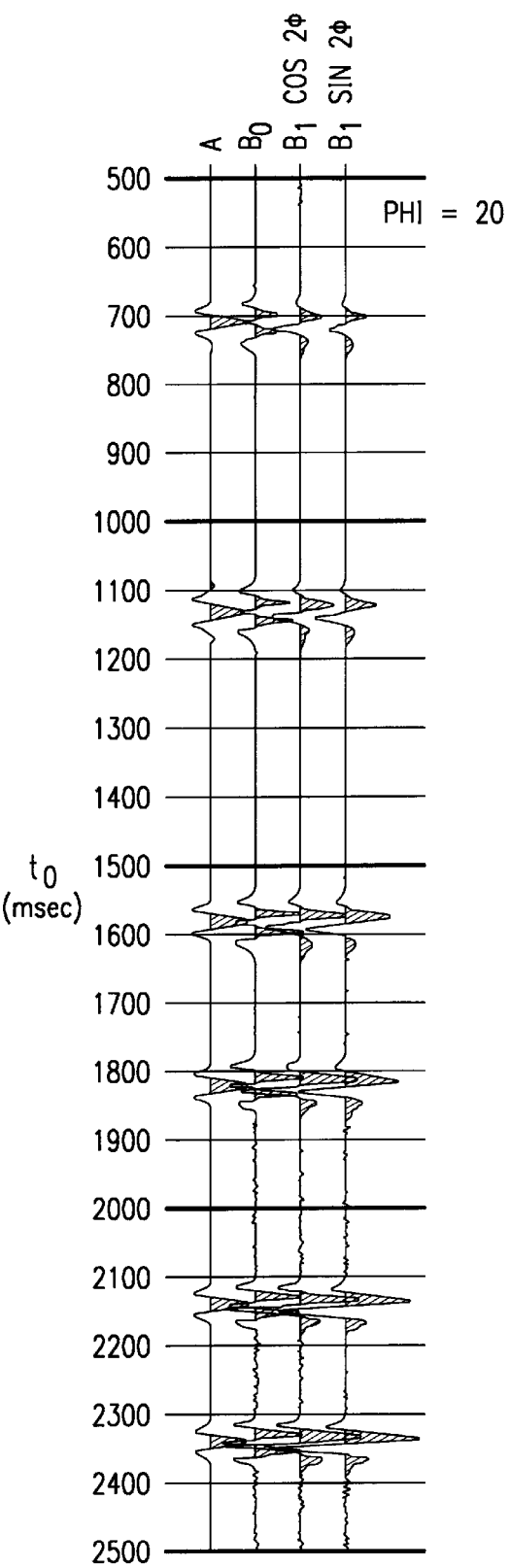
Figure 3E:
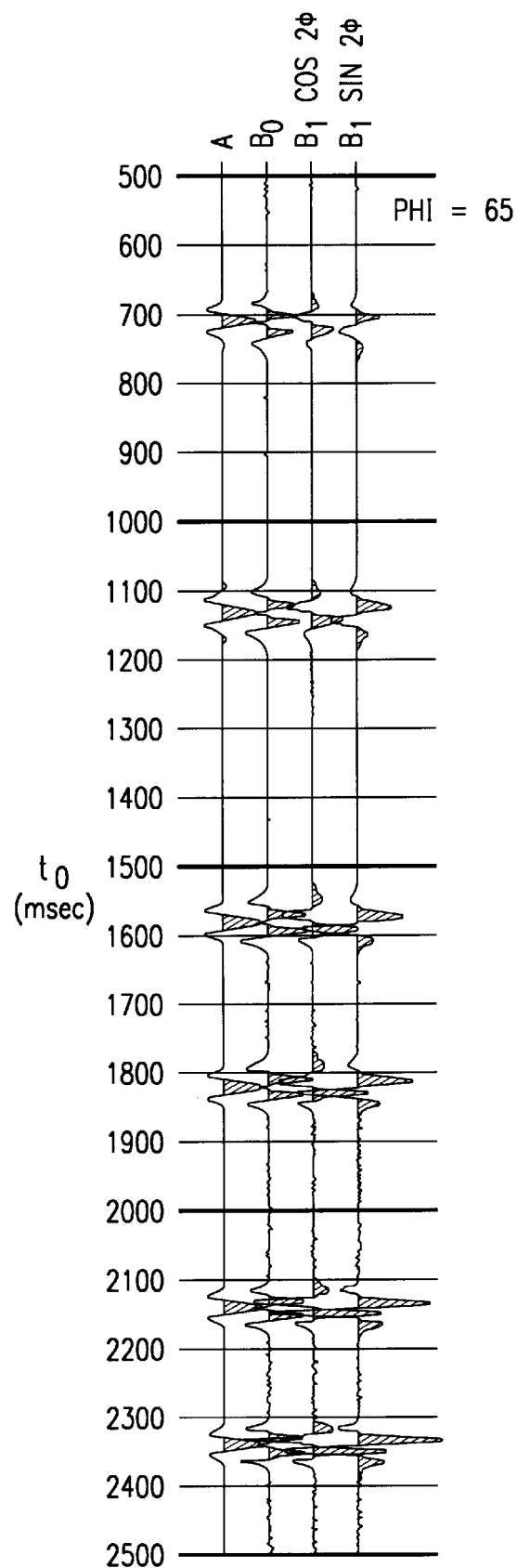

Referring now to FIG. 3a, a synthetic example of the effect of overburden-caused azimuthal anisotropy will now be described. FIG. 3a illustrates four functions of model coefficients over zero-offset two-way time $t_0$, for multiple traces of varying offset and azimuth in a common midpoint gather, after conventional Dix equation normal moveout correction. Referring back to the model:

$$N(t_0, \theta, \Psi) = A(t_0) + [B_0(t_0) + B_1(t_0) \cos 2\Psi \cos 2\psi + B_1(t_0) \sin 2\Psi \sin 2\psi] \sin^2 \theta$$

the four estimated coefficient functions A($t_0$), $B_0(t_0)$, $B_1(t_0)$ cos 2ψ, and $B_1(t_0)$ sin 2ψ are illustrated in FIG. 3a. In this example, the seismic signals have no true amplitude variation with offset other than the well-known effects of NMO "stretch", where the shape of the wavelets at long offsets are stretched by the application of Dix equation normal moveout correction; the extent of NMO stretch is 30% in the example of FIG. 3a. As known in the art, the effects of NMO stretch are exhibited in FIG. 3a by coefficient function $B_0(t_0)$, as the relative phase relationship between $B_0(t_0)$ and A($t_0$) is 180°.

The variations in azimuthal anisotropy coefficient functions $B_1(t_0)$ cos 2ψ and $B_1(t_0)$ sin 2ψ indicate the existence of overburden-caused azimuthal anisotropy; in this example, the synthetic traces include a 2% azimuthal anisotropy velocity preference in the overburden, at a selected angle, with no preferred reflection direction at the interface. As illustrated in FIG. 3a, the azimuthal anisotropy coefficient functions $B_1(t_0)$ cos 2ψ and $B_1(t_0)$ sin 2ψ each exhibit wavelets that are in quadrature phase with a corresponding wavelet of coefficient function A($t_0$). This quadrature relationship is evident by the positive peak of each A($t_0$) wavelet being at the same time to as a zero-crossing of wavelets in the azimuthal anisotropy coefficient functions $B_1(t_0)$ cos 2ψ and $B_1(t_0)$ sin 2ψ. In the example of FIG. 3a, therefore, the entirety of the azimuthal anisotropy coefficient functions $B_1(t_0)$ cos 2ψ and $B_1(t_0)$ sin 2ψ is in quadrature phase with coefficient function A($t_0$), indicating that the azimuthal anisotropy is entirely due to azimuthally anisotropic velocity characteristics in the overburden.

According to the present invention, one may determine the preferential azimuth ψ from the time series of the azimuthal anisotropy coefficient functions $B_1(t_0)$ cos 2ψ and $B_1(t_0)$ sin 2ψ. At a given $t_0$, the ratio of the values of the azimuthal anisotropy coefficient functions $B_1(t_0)$ cos 2ψ and $B_1(t_0)$ sin 2ψ readily reduces to the tangent of the angle 2ψ:

$$\frac{B_1(t_0)\sin 2\varphi}{B_1(t_0)\cos 2\varphi} = \frac{\sin 2\varphi}{\cos 2\varphi} = \tan 2\varphi$$

Accordingly, one may simply evaluate the ratio of the azimuthal anisotropy coefficient functions $B_1(t_0)\cos 2\psi$ and $B_1(t_0)\sin 2\psi$ at one or more values of zero-offset two-way time $t_0$ to arrive at an estimate of the preferred azimuthal angle $\psi$.

FIGS. 3b through 3e illustrate multiple examples of synthetically modeled overburden azimuthal anisotropy, where each of the exemplary gathers in FIGS. 3b through 3e include a 2% overburden azimuthal anisotropy with a different preferred azimuthal angle $\psi$ from the others of FIGS. 3b through 3e. The coefficient functions $A(t_0)$ and $B_0(t_0)$ are identical in each of FIGS. 3b through 3e, which is consistent with their independence from the preferred azimuthal angle $\psi$. In contrast, because of the differing preferred azimuthal angle $\psi$, it is evident from FIGS. 3b through 3e that the azimuthal anisotropy coefficient functions $B_1(t_0)\cos 2\psi$ and $B_1(t_0)\sin 2\psi$ vary with preferred azimuthal angle $\psi$. Because the azimuthal anisotropy is present in the modeled overburden in this example, the azimuthal anisotropy coefficient functions $B_1(t_0)\cos 2\psi$ and $B_1(t_0)\sin 2\psi$ are in quadrature phase with the coefficient function $A(t_0)$ in each of the examples of FIGS. 3b through 3e.

As noted above, determination of the preferred azimuthal angle $\psi$ may be made by evaluating the anisotropy coefficient functions $B_1(t_0)\cos 2\psi$ and $B_1(t_0)\sin 2\psi$ at a particular two-way time $t_0$, and by then calculating $$\frac{1}{2}\tan^{-1}\left(\frac{B_1(t_0)\sin 2\varphi}{B_1(t_0)\cos 2\varphi}\right)$$

to return the preferred azimuthal angle $\psi$. For example, evaluating the anisotropy coefficient functions $B_1(t_0)\cos 2\psi$ and $B_1(t_0)\sin 2\psi$ at $t_0$=700 msec in the examples of FIGS. 3b through 3e provides the following results:

| Figure | $B_1(t_0)\sin 2\phi$ | $B_1(t_0)\cos 2\phi$ | Estimated $\phi$ (in degrees) |
|---|---|---|---|
| 3b | −6.44 | −5.24 | −70.4 |
| 3c | 5.25 | −5.97 | −24.3 |
| 3d | 6.12 | 4.84 | 19.2 |
| 3e | −5.44 | 5.77 | 66.7 |

These calculated values of preferred azimuthal angle $\psi$ correlate well with the actual preferred azimuthal angles $\psi$ of −70°, −25°, 20°, and 65° used in the modeling of FIGS. 3b through 3e, respectively.

While one may determine the preferred azimuthal angle by analysis of the model coefficients, it is contemplated that the present invention is particularly beneficial in determining the accuracy of normal moveout corrections, following which the residual component of the azimuthal anisotropy coefficient function $B_1(t_0)$, preferably in-phase with coefficient $A(t_0)$, will indicate the azimuthal anisotropy of the subsurface reflectivity. According to the preferred embodiment of the invention, this operation is accomplished by decomposing the azimuthal anisotropy coefficient $B_1(t_0)$ into in-phase and quadrature-phase series, both with respect to intercept coefficient $A(t_0)$. As noted above, the quadrature-phase component of azimuthal anisotropy coefficient $B_1(t_0)$ will indicate the azimuthal anisotropy due to the overburden, while the in-phase component of azimuthal anisotropy coefficient $B_1(t_0)$ will indicate the azimuthal anisotropy of the subsurface reflectivity. Normal moveout correction can then be done to minimize the amplitude of the quadrature-phase component of azimuthal anisotropy coefficient $B_1(t_0)$, following which the residual azimuthal anisotropy coefficient $B_1(t_0)$ will be dominated by the in-phase, reflective-interface, component, and thus indicative of the properties of the reflective interface.

Figure 4:
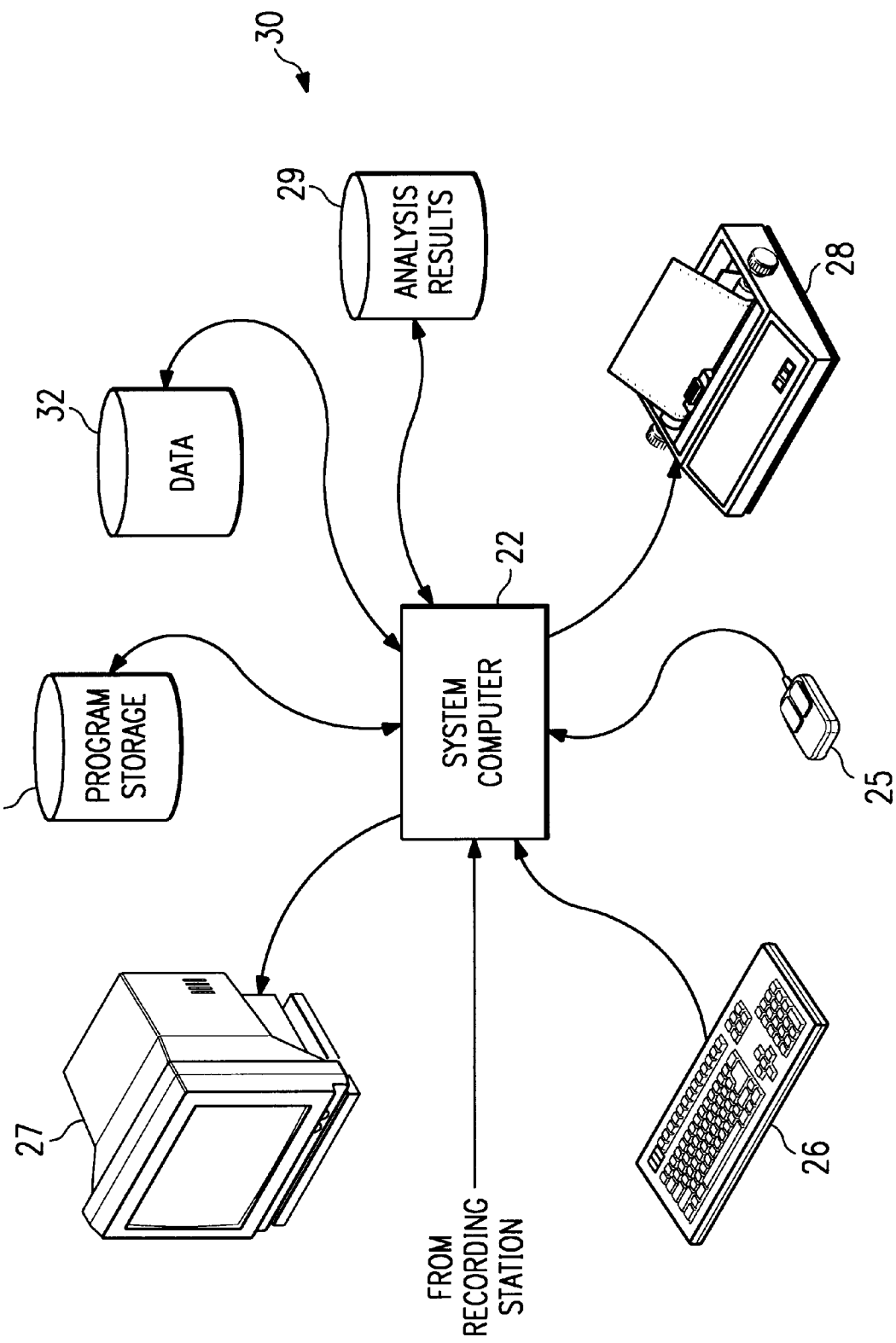
FIG. 4 is an electrical diagram, in block form, of a computer system according to the preferred embodiment of the invention.

Referring now to FIG. 4, the construction of analysis computer system 30 according to the preferred embodiment of the present invention will now be described. This description of analysis computer system 30 is merely an example, as it is to be understood that the present invention may be implemented into a computer system of any suitable architecture, including large mainframe computer systems, distributed computer systems, and the like. It is contemplated that those of ordinary skill in the art will be able to implement the present invention on various arrangements of computer systems.

Analysis computer system 30 includes system computer 22, which may be implemented as any conventional personal computer or workstation, preferably a UNIX-based workstation such as a SPARCstation available from Sun Microsystems, Inc., implemented either in standalone fashion or as part of a network arrangement. System computer 22 is in communication with disk storage devices 29, 30, 31, which are preferably external hard disk storage devices in a network. It is contemplated that disk storage devices 29, 30, 31 are conventional hard disk drives, and as such will be implemented by way of a local area network or by remote access. Of course, while disk storage devices 29, 30, 31, are illustrated as separate devices, a single disk storage device may of course be used to store any and all of the program instructions, measurement data, and results as desired.

In this embodiment of the invention, signals obtained from the seismic survey recording station, or from a data center, are received by system computer 22 and stored in digital form on disk storage device 30. System computer 22 can then retrieve the appropriate data from disk storage device 30 to perform the desired analysis, according to program instructions corresponding to the preferred embodiment of the invention as described in detail hereinbelow. For operation on system computer 22, the program instructions are written in the form of computer programs (e.g., in C++ or in any other object-oriented language) stored in computer-readable memory, such as program disk storage device 31 of FIG. 3; of course, the memory medium storing the computer program may be of any conventional type used for the storage of computer programs, including hard disk drives, floppy disks, CD-ROM disks, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage device 29, for later use and further analysis. Keyboard 26 and pointing device 25 (e.g., a mouse, trackball, or the like) are provided with system computer 22 to enable interactive operation. As noted, system computer 22 is able to communicate with disk storage devices 29, 30, 31, including external hard disk storage on a network and floppy disk drives. As noted above, analysis computer system 30 is typically located at a data center remote from the survey region, but may alternatively be deployed in situ at the survey when desired.

Figure 5:
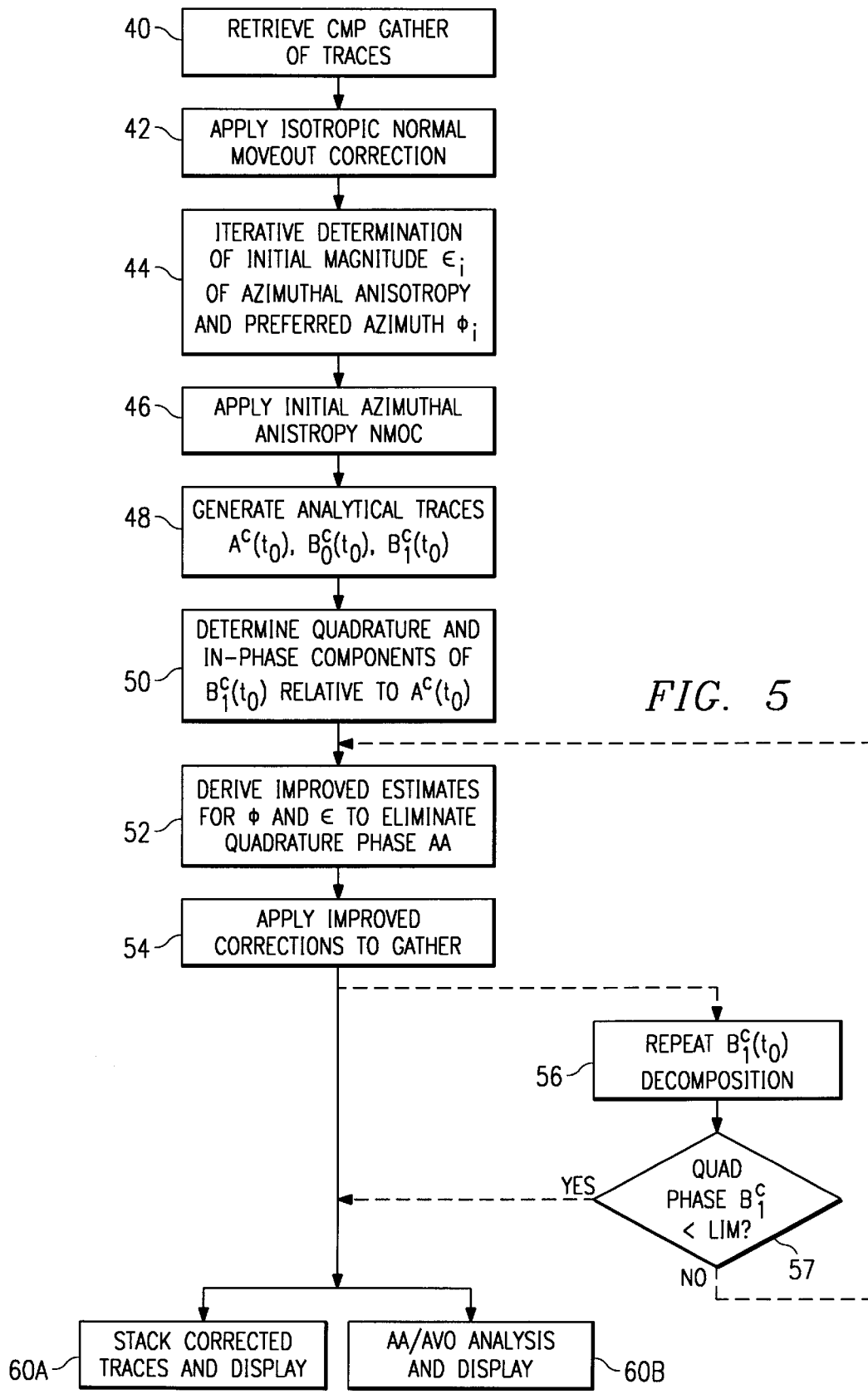
FIG. 5 is a flow chart illustrating the operation of the preferred embodiment of the invention.

Referring now to FIG. 5, the operation of analysis computer system 30 according to the preferred embodiment of the present invention will now be described in detail. It is contemplated that the necessary and appropriate programming of analysis computer system 30 to perform the method that will now be described relative to FIG. 5.

In process 40, system computer 22 retrieves a common midpoint (CMP) gather of traces from memory, such as from data storage device 30. The CMP gather retrieved in process 40 preferably includes a statistically rich distribution of offset and azimuth in its traces; for full and accurate 3D analysis, it is preferred that the offsets and azimuths in the retrieved gather are not correlated with one another. As will be apparent from the following description, the method according to the preferred embodiment of the invention is preferably performed on individual CMP gathers, rather than upon multiple gathers; as such process 40 is illustrated in FIG. 5 as retrieving a single gather. It will be understood by those of ordinary skill in the art, of course, that the retrieval of a CMP gather in process 40 may be performed at various stages in the process, in which case multiple gathers will be retrieved and partially processed according to this method prior to completion of the processing for any one of the gathers. These and other alternative approaches, particularly relative to the order of retrieval process 40 in the overall method, are contemplated to be within the discretion of those of ordinary skill in the art having reference to this specification, with the selection of the particular approach made according to factors such as the capability of analysis system computer 30, the size of the survey, and the like.

Following retrieval of the CMP gather in process 40, system computer 22 next preferably applies conventional normal moveout correction to the retrieved gather, in process 42. Other conventional prestack filtering processes may additionally be performed and applied to the retrieved gather at this time, as desired. The normal moveout correction performed in process 42 may be performed in the conventional manner according to the well-known Dix equation, by estimating a stacking velocity function over depth for the retrieved gather and correcting the traces in the gather as a function of offset. Improved normal moveout correction techniques may additionally be used in process 42, to correct the retrieved gather for the effects of NMO stretch as described in U.S. Pat. No. 5,684,754, issued Nov. 4, 1997, and for phase dispersion effects as described in copending and commonly assigned application Ser. No. 08/745,452, filed Nov. 12, 1996, both such applications incorporated herein by this reference. In any case, the normal moveout correction determined and applied in process 42 assumes azimuthal isotropy of the survey region, and as such is performed independently from the azimuth of the traces in the retrieved gather.

Following process 42, process 44 is next performed by system computer 22 upon the corrected CMP gather to determine an initial azimuthal anisotropy magnitude value $\epsilon_i$ and an initial azimuthal anisotropy preferred azimuth $\psi_i$. According to the preferred embodiment of the present invention, process 44 is performed by system computer 22 according to the method described in the above-incorporated U.S. Pat. No. 5,532,978, and as will now be described relative to FIG. 6.

Process 44 begins with process 62, in which system computer 22 initializes trial magnitude value $\epsilon$ and trial preferred azimuth value $\psi$. The particular values to which trial values $\epsilon$, $\psi$ are initialized are not important, so long as they are within the expected range of the actual anisotropic behavior of the survey. Using trial values $\epsilon$, $\psi$, system computer 22 next, in process 64, applies azimuthal anisotropy normal moveout corrections to each trace in the retrieved CMP gather, according to the following relationship:

$$t^2 = t_0^2 + \frac{r^2}{v^2}[1 - \tilde{\epsilon}\cos 2(\tilde{\varphi} - \psi)]$$

where r and $\Psi$ are the offset and azimuth, respectively, of the trace being corrected, and where v is the stacking velocity for the gather determined in process 42. The above relationship is the total moveout correction for uncorrected traces, as it includes both the Dix equation hyperbolic correction and also the correction for azimuthal anisotropy. In the case where isotropic normal moveout correction is already performed on the traces, as described above relative to process 42, process 62 simply applies an additional normal moveout adjustment $\Delta t$ to the previously corrected traces, derived as follows:

$$\Delta t^2 = -\frac{r^2}{v^2}[\tilde{\epsilon}\cos 2(\tilde{\varphi} - \psi)]$$

Once the trial azimuthal anisotropic is applied to each trace in process 64, process 66 is performed by system computer to stack the corrected traces, from all offsets and azimuths in the gather, into a single stacked trace. The stacking performed in process 66 is simply a summation of the time series of the traces in the gather.

Process 68 is then performed by system computer 68 to derive an energy measurement of the stack. As is known in the art, the energy of a CMP stack is maximized at the optimum normal moveout correction; miscorrection generally is reflected in wavelets that do not fully align and reinforce one another, and that effectively tend to cancel out among traces. The energy measurement performed in process 68 may be as simple as a sum-of-squares operation performed over the time series represented by the stacked trace.

Decisions 69, 71 are then performed to determine if additional ones of trial values $\epsilon$, $\psi$, in the set of trial values $\epsilon$, $\psi$ to be applied to the traces, remain to be analyzed. If one or more trial azimuth values $\psi$ remain (decision 69 is YES), process 70 is performed to incrementally adjust trial azimuth value $\psi$, following which processes 64, 66, 68 are then repeated. If no additional trial azimuth values $\psi$ remain for the current trial magnitude value $\epsilon$ (decision 69 is NO), decision 71 determines if additional trial magnitude values $\epsilon$ remain. If so (decision 71 is YES), trial magnitude value $\epsilon$ is adjusted and trial azimuth $\psi$ is initialized in process 72. If no additional trial magnitude values $\epsilon$ remain (decision 71 is NO), control passes to process 74.

In process 74, system computer 22 analyzes the set of stack energies determined in the multiple passes through process 68, and selects the combination of trial values $\epsilon$, $\psi$ that provided the maximum energy, and that therefore provided the best azimuthally anisotropic normal moveout correction. Process 74, and thus process 44, is then completed by system computer 22 setting the initial azimuthal anisotropy magnitude $\epsilon_i$ and initial preferred azimuth $\psi_i$ equal to the trial values $\epsilon$, $\psi$ at this maximum energy combination.

Alternative approaches to the execution of process 44 may alternatively be used. For example, a semblance analysis approach may be performed on the traces corrected with trial azimuthal anisotropy values $\epsilon$, $\psi$, to provide a measure of the correlation of the corrected traces with one another. Other alternative methods may also be utilized to select a combination of initial azimuthal anisotropy magnitude $\epsilon_i$ and initial preferred azimuth $\psi_i$, for use in the remainder of the method according to the preferred embodiment of the present invention.

Referring back to FIG. 5, process 46 is next performed to apply an initial azimuthal anisotropy correction to each of the traces in the retrieved gather, using the initial azimuthal anisotropy magnitude $\epsilon_i$ and initial preferred azimuth $\psi_i$ determined in process 44. This azimuthal anisotropy correction t is determined by use of the same correction to the Dix equation as described above, namely:

$$t^2 = t_0^2 + \frac{r^2}{v^2}[1 - \epsilon_i \cos 2(\varphi_i - \psi)]$$

Each of the traces in the retrieved gather are corrected by system computer 22, and the corrected traces are stored in memory.

As described in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92, and in U.S. Pat. No. 5,297,108, both incorporated by reference hereinabove, one may consider the AVO intercept $A(t_0)$ and the AVO slope $B(t_0)$ as the real parts of a complex trace that can be readily calculated. This concept is described for seismic traces in general in Taner, et al., "Complex seismic trace analysis", *Geophysics*, Vol. 44, No. 6 (June, 1979), pp. 1041 through 1063). As described in the Swan references, the use of analytical traces in the field of AVO provides important information regarding the presence of hydrocarbons.

It has been discovered, in connection with the present invention and as described hereinabove, that the use of analytical traces for the coefficients of the azimuthal anisotropy model also provides indications as to the source of the azimuthal anisotropy. According to the preferred embodiment of the invention, system computer 22 derives, in process 48, analytical traces $A^c(t_0)$, $B_0^c(t_0)$, and $B_1^c(t_0)$ for the corrected retrieved gather. As illustrated in FIG. 7, process 48 is preferably performed by first performing process 76, in which the corrected retrieved gather, expressible as dataset $N(t_0, r, \Psi)$, is characterized by system computer 22 according to the model:

$$N(t_0, r, \Psi) = A(t_0) + [B_0(t_0) + B_1(t_0) \cos 2(\Psi - \psi)] \sin^2 \theta$$

Of course, one may substitute the reflection angle $\theta$ for offset r in this model, depending upon the units of measure in the trace. Characterization process 76 is preferably performed by way of a three-parameter semblance analysis, where the azimuthal anisotropy coefficient functions or series $A(t_0)$, $B_0(t_0)$, $B_1(t_0)$ are determined by way of a best-fit approach.

Following process 76, analytical traces for the azimuthal anisotropy coefficients $A(t_0)$, $B_0(t_0)$, $B_1(t_0)$ are generated, in the fashion described hereinabove relative to the Taner et al. and Swan references, by considering each azimuthal anisotropy coefficient $A(t_0)$, $B_0(t_0)$, $B_1(t_0)$ as the real component of its respective analytical traces $A^c(t_0)$, $B_0^c(t_0)$, and $B_1^c(t_0)$, and by generating the imaginary component of the analytical traces $A^c(t_0)$, $B_0^c(t_0)$, and $B_1^c(t_0)$ by way of the Hilbert transform. Specifically, the forms of the analytical traces $A^c(t_0)$, $B_0^c(t_0)$, and $B_1^c(t_0)$ are as follows:

$A^c(t_0) = A(t_0) + i[\mathcal{H}A(t_0)]$
$B_0^c(t_0) = B_0(t_0) + i[\mathcal{H}B_0(t_0)]$
$B_1^c(t_0) = B_1(t_0) + i[\mathcal{H}B_1(t_0)]$ where i is the square root of $-1$, and where $\mathcal{H}$ indicates the Hilbert transform. The Taner et al. article, incorporated by reference hereinabove, describes a digital method for generating complex, or analytical, traces in the general sense.

Once the analytical traces $A^c(t_0)$, $B_0^c(t_0)$, and $B_1^c(t_0)$ are generated in process 48, system computer 22 next performs process 50 to determine the phase relationship between analytical azimuthal anisotropy trace $B_1^c(t_0)$ and the analytical coefficient trace $A^c(t_0)$. As described above, the extent to which analytical azimuthal anisotropy trace $B_1^c(t_0)$ is in quadrature phase with analytical coefficient trace $A^c(t_0)$ indicates the extent to which azimuthal anisotropy is due to the overburden; conversely, the extent to which analytical azimuthal anisotropy trace $B_1^c(t_0)$ is in phase (or $-180°$ out of phase) with analytical coefficient trace $A^c(t_0)$ indicates the extent to which azimuthal anisotropy is due to the reflecting surface. Also as noted above, azimuthal anisotropy from the overburden is preferably isolated from azimuthal anisotropy due to a preferred direction of reflection; while each of these components of azimuthal anisotropy may individually provide useful information, these components will generally interfere with one another when combined into a single trace. For example, the azimuthal anisotropy of subsurface reflectivity is of interest in exploration using AVO techniques, in which case the "noise" caused by overburden azimuthal anisotropy should be taken into account in order to determine the true subsurface reflectivity attributes.

The quadrature phase and in-phase components of analytical azimuthal anisotropy trace $B_1^c(t_0)$ relative to the analytical coefficient trace $A^c(t_0)$ are readily determined simply by multiplying the complex analytical coefficient trace $A^c(t_0)$ by the analytical azimuthal anisotropy complex conjugate trace $B_1^{c*}(t_0)$. The real part of the product $A^c(t_0) B_1^{c*}(t_0)$ is indicative of the magnitude of the in-phase component of the azimuthal anisotropy coefficient $B_1(t_0)$, while the imaginary part of the product $A^c(t_0) B_1^{c*}(t_0)$ is indicative of the magnitude of the quadrature phase component of the azimuthal anisotropy coefficient $B_1(t_0)$. The multiplication performed in process 50 to derive these components is contemplated to be readily performed by system computer 22 according to convention digital techniques for executing complex arithmetic.

Once the quadrature phase component of the azimuthal anisotropy coefficient $B_1(t_0)$ is determined in process 50, system computer 22 then derives an improved estimate of the azimuthal anisotropy magnitude $\epsilon$ and preferred azimuth $\psi$, in process 52. The new estimates of values $\epsilon$, $\psi$ are determined in such a manner as to reduce the quadrature phase component of the azimuthal anisotropy coefficient $B_1(t_0)$ to zero. For example, the determination of an improved estimate for preferred azimuth $\psi$ may be derived by generating traces corresponding to the quadrature phase components of anisotropy coefficient functions $B_1(t_0) \cos 2\psi$ and $B_1(t_0) \sin 2\psi$, following which system computer 22 may evaluate the value of $$\frac{1}{2}\tan^{-1}\left(\frac{B_1(t_0)\sin 2\varphi}{B_1(t_0)\cos 2\varphi}\right)$$

to generate an improved estimated preferred azimuth $\psi_i$ so as to eliminate the effects of overburden-dependent azimuthal anisotropy.

In process 54, newly-estimated azimuthal anisotropy magnitude value $\epsilon_i$ and newly-estimated preferred azimuth $\psi_i$ are used in generating and applying new normal moveout corrections, according to the above-described relationship:

$$t^2 = t_0^2 + \frac{r^2}{v^2}[1 - \varepsilon_i \cos 2(\varphi_i - \psi)]$$

Such corrections are applied to each trace in the gather.

Following the application of the improved correction, conventional processing of the corrected seismic traces may now continue. For example, as illustrated in FIG. 5 by process 60A, the corrected traces in the CMP gather may be stacked and used to provide high quality information regarding the depth and characteristics of reflective interfaces in the vicinity of midpoint MP. It is contemplated that the normal moveout correction generated by taking into account the effects of azimuthal anisotropy, will provide a higher quality seismic survey, with more visibility provided into weak signal regions such as very deep reflective interfaces and weak reflectors.

Alternatively or additionally, conventional amplitude-versus-offset (AVO) analysis may be performed, by system computer 22 in process 60B, upon the corrected traces prior to (or instead of) the stacking process. According to the preferred embodiment of the invention, such AVO analysis can include azimuthal analysis by way of which attributes of the reflecting surface may be analyzed, particularly in determining if a preferred direction of reflection is present. The present invention facilitates this type of analysis, as the in-phase component of the azimuthal anisotropy coefficient $B_1(t_0)$ is related solely to the magnitude of the preferential reflections at the interface and not to anisotropy from the overburden. The analyst may therefore more readily identify the extent of subsurface reflectivity anisotropy, which may indicate the presence of aligned fractures and other interesting artifacts.

In either case of stacking of the traces of the gather, or in AVO and azimuthal analysis, improved surveys may be readily displayed on display device 27, output on printer 28, or stored in disk storage device 29, or any combination thereof, depending upon the desire of the analyst.

As illustrated in FIG. 5, the process according to the preferred embodiment of the present invention may be repeated in an iterative fashion if desired, and depending upon the results of the correction of process 54. According to this optional quality control approach, system computer 22 performs process 56 upon these newly-corrected traces to again decompose the traces (as in process 48 described above) and to determine the magnitude of the quadrature phase component of azimuthal anisotropy coefficient $B_1(t_0)$ (as in process 50 described above) to measure the magnitude of the azimuthal anisotropy error that remains in the gather and that is due to the overburden. In decision 57, system computer 22 compares this measure against a preselected limit. If the quadrature phase component of azimuthal anisotropy coefficient $B_1(t_0)$ is below the limit (decision 57 is YES), conventional survey processing is performed (processes 60A, 60B); if not (decision 57 is NO), another set of estimates for azimuthal anisotropy magnitude $\epsilon$ and preferred azimuth $\psi$ are generated in process 52, applied to the traces, and process 56 and decision 57 are then again repeated.

According to the preferred embodiment of the invention, therefore, important advantages are provided in the field of seismic exploration. One such advantage is the improved ability to separate azimuthal anisotropy effects caused by the overburden from those caused by anisotropy of subsurface reflectivity. This permits the normal moveout correction to be more accurately determined and applied, which improves the signal-to-noise ratio obtainable from stacking. In addition, the present invention also provides direct information regarding the extent of anisotropy in subsurface reflectivity, and thus information regarding the characteristics of the underlying geology.

Other advantages of the present invention will be apparent to those of ordinary skill in the art having reference to this specification together with its drawings.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to correct seismic survey signals for the effects of overburden azimuthal anisotropy, the seismic survey signals corresponding to acoustic energy detected at a plurality of locations of the surface of the earth after traveling through the earth and being reflected from one or more subsurface geological structures, comprising the steps of:

retrieving, from computer memory, seismic trace data corresponding to a first gather of seismic traces representative of acoustic energy detected at the plurality of surface locations, the first gather of seismic traces including seismic trace data collected over time corresponding to a plurality of offset distances and a plurality of azimuths, and having a first common midpoint;

correcting the seismic trace data in the first gather for normal moveout;

decomposing the corrected seismic trace data to generate first and second coefficient series, the first coefficient series associated with travel time and the second coefficient series associated with azimuth;

generating analytical traces of the first and second coefficient series;

measuring the magnitude of a quadrature phase component of the second coefficient series relative to the first coefficient series;

again correcting the corrected seismic trace data to reduce the magnitude of the quadrature phase component of the second coefficient series.

2. The method of claim 1, further comprising:

selecting a trial preferred azimuth and a trial azimuthal anisotropy magnitude;

applying azimuth-dependent corrections to the seismic trace data in the first gather using the trial preferred azimuth and trial azimuthal anisotropy magnitude;

stacking the seismic trace data after the applying step;

measuring the energy of the stacked seismic trace data;

adjusting the trial preferred azimuth and a trial azimuthal anisotropy magnitude;

repeating the applying, stacking, and measuring steps; and determining an initial preferred azimuth and an initial azimuthal anisotropy magnitude as the values of the trial preferred azimuth and a trial azimuthal anisotropy magnitude for which the measured energy of the stacked seismic trace data is maximized;

and wherein the step of correcting the seismic trace data comprises correcting the seismic trace data for azimuth-dependent corrections, using the initial preferred azimuth and initial azimuthal anisotropy magnitude.

3. The method of claim 2, further comprising:

prior to the selecting, applying, stacking, and measuring steps, correcting the seismic trace data in the first gather for offset-dependent normal moveout.

4. The method of claim 1, further comprising:

prior to the selecting, applying, stacking, and measuring steps, correcting the seismic trace data in the first gather for offset-dependent normal moveout.

5. The method of claim 1, wherein the step of generating analytical traces comprises:

performing a semblance analysis of the corrected seismic trace data in the first gather to generate the first and second coefficient series;

generating an analytical trace of the first coefficient series which comprises a real component equivalent to the first coefficient series and an imaginary component equivalent to the Hilbert transform of the first coefficient series; and generating an analytical trace of the second coefficient series which comprises a real component equivalent to the second coefficient series and an imaginary component equivalent to the Hilbert transform of the second coefficient series.

6. The method of claim 5, wherein the step of measuring the magnitude of a quadrature phase component of the second coefficient series relative to the first coefficient series comprises:

calculating a product of the analytical trace of the first coefficient series with the complex conjugate of the analytical trace of the second coefficient series, the product having real and complex components;

measuring the magnitude of the complex component of the product.

7. The method of claim 6, wherein the step of again correcting the corrected seismic trace data to reduce the magnitude of the quadrature phase component of the second coefficient series comprises:

further decomposing the second coefficient series into a first component dependent upon the sine of the preferred azimuth angle and into a second component dependent upon the cosine of the preferred azimuth angle; and determining the preferred azimuth angle from a ratio of the first and second components of the further decomposed second coefficient series evaluated at a selected travel time.

8. The method of claim 1, further comprising:

storing the again-corrected seismic trace data in memory.

9. The method of claim 1, further comprising:

after the step of again correcting the corrected seismic trace data to reduce the magnitude of the quadrature phase component of the second coefficient series, stacking the again-corrected seismic trace data for the first gather.

10. The method of claim 9, further comprising:

after the stacking step, storing the stacked seismic trace data for the first gather;

repeating the retrieving, correcting, decomposing, generating, measuring, again correcting, stacking, and storing steps for a plurality of additional gathers of seismic traces, each of the additional gathers of seismic traces including seismic trace data collected over time corresponding to a plurality of offset distances and a plurality of azimuths, and having a common midpoint; and then generating a seismic survey from the stacked seismic trace data for the first and additional gathers.

11. The method of claim 1, further comprising:

measuring the magnitude of an in-phase component of the second coefficient series relative to the first coefficient series; and after the step of again correcting the corrected seismic trace data to reduce the magnitude of the quadrature phase component of the second coefficient series, measuring the magnitude and angle of in-phase component of the second coefficient series, such magnitude and angle indicative of azimuthal anisotropy of subsurface reflectivity.

12. The method of claim 1, further comprising:

selecting a trial preferred azimuth and a trial azimuthal anisotropy magnitude;

applying azimuth-dependent corrections to the seismic trace data in the first gather using the trial preferred azimuth and trial azimuthal anisotropy magnitude;

stacking the seismic trace data after the applying step;

measuring the energy of the stacked seismic trace data;

adjusting the trial preferred azimuth and a trial azimuthal anisotropy magnitude;

repeating the applying, stacking, and measuring steps;

determining an initial preferred azimuth and an initial azimuthal anisotropy magnitude as the values of the trial preferred azimuth and a trial azimuthal anisotropy magnitude for which the measured energy of the stacked seismic trace data is maximized;

wherein the step of correcting the seismic trace data comprises correcting the seismic trace data for azimuth-dependent corrections, using the initial preferred azimuth and initial azimuthal anisotropy magnitude;

after the step of again correcting the corrected seismic trace data to reduce the magnitude of the quadrature phase component of the second coefficient series, repeating the decomposing, generating, and measuring steps; and responsive to the repeated measuring step indicating that the magnitude of the quadrature phase component of the second coefficient series relative to the first coefficient series is greater than a limit, adjusting the initial preferred azimuth and initial azimuthal anisotropy magnitude and repeating the step of again correcting the corrected seismic trace data to reduce the magnitude of the quadrature phase component of the second coefficient series, using the adjusted preferred azimuth and azimuthal anisotropy magnitude.

13. A digital computing system for correcting seismic survey for the effects of overburden azimuthal anisotropy, comprising:

a memory for storing seismic trace data corresponding to seismic survey signals corresponding to acoustic energy detected at a plurality of locations of the surface of the earth after traveling through the earth and being reflected from one or more subsurface geological structures, the seismic trace data corresponding to a plurality of gathers of seismic traces representative of acoustic energy detected at the plurality of surface locations, each gather of seismic traces including seismic trace data collected over time corresponding to a plurality of offset distances and a plurality of azimuths, and having a common midpoint a graphics display output device; and a programmed computer, coupled to the memory and to the output device, for:

retrieving, from the memory, seismic trace data corresponding to a selected gather of seismic traces;

correcting the seismic trace data in the selected gather for normal moveout;

decomposing the corrected seismic trace data to generate first and second coefficient series, the first coefficient series associated with travel time and the second coefficient series associated with azimuth;

generating analytical traces of the first and second coefficient series;

measuring the magnitude of a quadrature phase component of the second coefficient series relative to the first coefficient series;

again correcting the corrected seismic trace data to reduce the magnitude of the quadrature phase component of the second coefficient series; and storing the again-corrected seismic trace data in the memory.

14. The system of claim 13, wherein the computer is further programmed for:

after the step of again correcting the corrected seismic trace data to reduce the magnitude of the quadrature phase component of the second coefficient series, stacking the again-corrected seismic trace data for the selected gather; and storing the stacked seismic trace data in the memory.

15. The system of claim 14, wherein the computer is further programmed to:

repeating the retrieving, correcting, decomposing, generating, measuring, again correcting, stacking, and storing steps for a plurality of gathers of seismic traces; and then displaying, on the output device, a seismic survey from the stacked seismic trace data for the plurality of gathers.

16. The system of claim 13, wherein the computer is further programmed for:

measuring the magnitude of an in-phase component of the second coefficient series relative to the first coefficient series; and after the step of again correcting the corrected seismic trace data to reduce the magnitude of the quadrature phase component of the second coefficient series, measuring the magnitude and angle of in-phase component of the second coefficient series, such magnitude and angle indicative of azimuthal anisotropy of subsurface reflectivity.

17. The system of claim 13, wherein the computer is further programmed for:

selecting a trial preferred azimuth and a trial azimuthal anisotropy magnitude;

applying azimuth-dependent corrections to the seismic trace data in the selected gather using the trial preferred azimuth and trial azimuthal anisotropy magnitude;

stacking the seismic trace data after the applying step;

measuring the energy of the stacked seismic trace data;

adjusting the trial preferred azimuth and a trial azimuthal anisotropy magnitude;

repeating the applying, stacking, and measuring steps; and determining an initial preferred azimuth and an initial azimuthal anisotropy magnitude as the values of the trial preferred azimuth and a trial azimuthal anisotropy magnitude for which the measured energy of the stacked seismic trace data is maximized;

and wherein the step of correcting the seismic trace data comprises correcting the seismic trace data for azimuth-dependent corrections, using the initial preferred azimuth and initial azimuthal anisotropy magnitude.

18. The system of claim 13, wherein the computer is programmed to perform the operation of generating analytical traces by:

performing a semblance analysis of the corrected seismic trace data in the selected gather to generate the first and second coefficient series;

generating an analytical trace of the first coefficient series which comprises a real component equivalent to the first coefficient series and an imaginary component equivalent to the Hilbert transform of the first coefficient series; and generating an analytical trace of the second coefficient series which comprises a real component equivalent to the second coefficient series and an imaginary component equivalent to the Hilbert transform of the second coefficient series.

19. The system of claim 13, wherein the computer is programmed to perform the operation of measuring the magnitude of a quadrature phase component of the second coefficient series relative to the first coefficient series by:

calculating a product of the analytical trace of the first coefficient series with the complex conjugate of the analytical trace of the second coefficient series, the product having real and complex components; and measuring the magnitude of the complex component of the product.

* * * * *

UNITED STATES PATENT AND TRADEMARK OFFICE
CERTIFICATE OF CORRECTION

PATENT NO.   : 6,061,301                                              Page 1 of 3
DATED        : May 9, 2000
INVENTOR(S)  : Dennis Corrigan It is certified that error appears in the above-identified patent and that said Letters Patent is hereby corrected as shown below:

Column 1,
Line 40, "for land and mine surveys," should read -- for land and marine surveys, --

Column 5,
Line 17, "velocity) at azimuth $\Psi$." should read -- velocity) at azimuth $\varphi$. --
Line 24, "where to is the zero-offset" should read -- where $t_o$ is the zero-offset --
Line 45, "$2(\Psi - \psi)] \sin^2 \theta$" should read -- $2(\Psi - \varphi)] \sin^2 \theta$ --
Line 49, "$2\Psi\cos2\psi+B_1$" should read -- $2\Psi\cos2\varphi+B_1$ --
Line 50, "$2\psi]\sin^2\theta$" should read -- $2\varphi]\sin^2\theta$ --
Line 51, "where $\Psi$ is the azimuth" should read -- where $\varphi$ is the azimuth --

Column 6,
Line 29, "$\cos2\Psi\cos\psi+B_1$" should read -- $\cos2\Psi\cos2\varphi+B_1$ --
Line 30, "$2\psi]\sin^2\theta$" should read -- $2\varphi]\sin^2\theta$ --
Line 33, "$2\psi$, and $B_1(t_o)\sin 2\psi$" should read -- $2\varphi$, and $B_1(t_o)\sin 2\varphi$ --
Line 43, "$2\psi$, and $B_1(t_o)\sin 2\psi$" should read -- $2\varphi$, and $B_1(t_o)\sin 2\varphi$ --
Line 50, "$2\psi$, and $B_1(t_o)\sin 2\psi$" should read -- $2\varphi$, and $B_1(t_o)\sin 2\varphi$ --
Line 53, "the same time to as a" should read -- the same time $t_o$ as a --
Lines 55-56, "$2\Psi$, and $B_1(t_o)\sin 2\Psi$" should read -- $2\varphi$, and $B_1(t_o)\sin 2\varphi$ --
Line 58, "$2\psi$, and $B_1(t_o)\sin 2\psi$" should read -- $2\varphi$, and $B_1(t_o)\sin 2\varphi$ --
Line 63, "azimuth $\Psi$ from the time" should read -- azimuth $\varphi$ from the time --
Lines 64-65, "$2\psi$, and $B_1(t_o)\sin 2\psi$" should read -- $2\varphi$, and $B_1(t_o)\sin 2\varphi$ --
Lines 66-67, "$2\psi$, and $B_1(t_o)\sin 2\psi$" should read -- $2\varphi$, and $B_1(t_o)\sin 2\varphi$ --
Line 67, "the angle $2\Psi$:" should read -- the angle $2\varphi$: --

Column 7,
Lines 6-7, "$2\psi$, and $B_1(t_o)\sin 2\psi$" should read -- $2\varphi$, and $B_1(t_o)\sin 2\varphi$ --
Line 9, "angle $2\Psi$." should read -- the angle $2\varphi$. --
Line 14, "azimuthal angle $\Psi$" should read -- azimuthal angle $\varphi$ --
Line 18, "$\psi$. In contrast ," should read -- $\varphi$. In contrast, --
Line 19, "angle $\psi$, it is evident" should read -- angle $\varphi$, it is evident --
Lines 20-21, "$2\psi$, and $B_1(t_o)\sin 2\psi$" should read -- $2\varphi$, and $B_1(t_o)\sin 2\varphi$ --
Line 21, "azimuthal angle $\Psi$" should read -- azimuthal angle $\varphi$ --
Line 24, "$2\psi$, and $B_1(t_o)\sin 2\psi$" should read -- $2\varphi$, and $B_1(t_o)\sin 2\varphi$ --
Line 28, "angle $\psi$ may be made" should read -- angle $\varphi$ may be made --

UNITED STATES PATENT AND TRADEMARK OFFICE
CERTIFICATE OF CORRECTION

PATENT NO.    : 6,061,301
DATED         : May 9, 2000
INVENTOR(S)   : Dennis Corrigan It is certified that error appears in the above-identified patent and that said Letters Patent is hereby corrected as shown below:

Column 7 (continued),
Line 29, "$2\psi$, and $B_1(t_o)\sin 2\psi$" should read -- $2\varphi$, and $B_1(t_o)\sin 2\varphi$ --
Line 36, "azimuthal angle $\Psi$" should read -- azimuthal angle $\varphi$ --
Line 37-38, "$2\psi$, and $B_1(t_o)\sin 2\psi$" should read -- $2\varphi$, and $B_1(t_o)\sin 2\varphi$ --
Line 43, "$B_1(t_o)\sin 2\phi$" should read -- $B_1(t_o)\sin 2\varphi$ --
Line 43, "Estimated $\phi$" should read -- Estimated $\varphi$ --
Line 49, "azimuthal angle $\Psi$" should read -- azimuthal angle $\varphi$ --
Line 50, "azimuthal angle $\Psi$" should read -- azimuthal angle $\varphi$ --

Column 9,
Line 54, "preferred azimuth $\psi_1$ ." should read -- preferred azimuth $\varphi_1$ --
Line 61, "magnitude value $\epsilon$ and" should read -- magnitude value $\tilde{\epsilon}$ and --
Line 62, "azimuth value $\psi_1$ " should read -- azimuth value $\tilde{\varphi}$ --
Line 63, "trial values $\epsilon$, $\psi$" should read -- trial values $\epsilon$, $\psi$ are --
Line 65, "trial values $\epsilon$, $\psi$, system" should read -- trial values $\tilde{\epsilon}$, $\tilde{\varphi}$, system --

Column 10,
Line 7, "where r and $\Psi$ are" should read -- where r and $\psi$ are --
Line 40, "trial values $\epsilon$, $\psi$, in" should read -- trial values $\tilde{\epsilon}$, $\tilde{\varphi}$, in --
Line 41, "$\epsilon$, $\psi$ to be applied" should read -- $\tilde{\epsilon}$, $\tilde{\varphi}$ to be applied --
Line 42, "values $\psi$ remain" should read -- values $\tilde{\varphi}$ remain --
Line 44, "value $\psi$, following" should read -- value $\tilde{\varphi}$, following --
Line 45, "values $\psi$ remain" should read -- values $\tilde{\varphi}$ remain --
Line 46, "magnitude value $\epsilon$" should read -- magnitude value $\tilde{\epsilon}$ --
Line 48, "$\epsilon$ remain. If so" should read -- $\tilde{\epsilon}$ remain. If so --
Line 49, "$\epsilon$ is adjusted and trial azimuth $\psi$" should read -- $\tilde{\epsilon}$ is adjusted and trial azimuth $\tilde{\varphi}$ --
Line 50, " values $\epsilon$ remain" should read -- values $\tilde{\epsilon}$ remain --
Line 54, "trial values $\epsilon$, $\psi$" should read -- trial values $\tilde{\epsilon}$, $\tilde{\varphi}$ --
Line 59, "preferred azimuth $\psi_i$" should read
-- preferred azimuth $\varphi_i$ --
Line 60, "the trial values $\epsilon$, $\psi$" should read -- the trial values $\tilde{\epsilon}$, $\tilde{\varphi}$ --
Line 65, "anisotropy values $\epsilon$, $\psi$" should read -- anisotropy values $\tilde{\epsilon}$, $\tilde{\varphi}$, to --

UNITED STATES PATENT AND TRADEMARK OFFICE
CERTIFICATE OF CORRECTION

PATENT NO.    : 6,061,301
DATED         : May 9, 2000
INVENTOR(S)   : Dennis Corrigan It is certified that error appears in the above-identified patent and that said Letters Patent is hereby corrected as shown below:

Column 11,
Line 2, "preferred azimuth $\psi_i$, for" should read -- preferred azimuth $\varphi_i$, for --
Line 8, "preferred azimuth $\psi_i$" should read -- preferred azimuth $\varphi_i$ --
Line 43, "$(t_o, r, \Psi)$" should read -- $(t_o, r, \psi)$ --
Line 45, "$N(t_o, r, \Psi)$" should read -- $N(t_o, r, \psi)$ --
Line 45, "$2(\Psi-\psi)$" should read -- $2(\psi-\varphi)$ --

Column 12,
Line 41, "according to convention digital" should read -- according to conventional digital --
Line 47, "$\psi$, in process 52." should read -- $\varphi$, in process 52." 
Line 47, "of values $\in$, $\psi$ are" should read -- of values $\varepsilon$, $\varphi$ are --
Line 51, "azimuth $\psi$ may be" should read -- azimuth $\varphi$ may be --
Lines 53-54, "$2\psi$ and $B_1(t_o)\sin 2\psi$," should read -- $2\varphi$ and $B_1(t_o)\sin 2\varphi$, --
Line 61, "preferred azimuth $\psi_i$ so" should read -- preferred azimuth $\varphi_i$ so --
Line 66, "$\psi_i$ are used in" should read -- $\varphi_i$ are used in --

Column 13,
Line 57, "preferred azimuth $\psi$ are" should read -- preferred azimuth $\varphi$ are --

Column 17,
Line 30, "further programmed to:" should read -- further programmed for: --

Signed and Sealed this

Fifth Day of March, 2002

*Attest:*

*Attesting Officer*

JAMES E. ROGAN
*Director of the United States Patent and Trademark Office*